(12) United States Patent
Bayne

(10) Patent No.: US 8,452,683 B2
(45) Date of Patent: *May 28, 2013

(54) SYSTEM AND METHOD FOR MAKING A SYNTHETIC CASH ADVANCE USING A PURCHASE PAYMENT EXCHANGE

(76) Inventor: Anthony Jeremiah Bayne, Lomita, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,325

(22) Filed: Mar. 12, 2012

(65) Prior Publication Data

US 2012/0173416 A1   Jul. 5, 2012

Related U.S. Application Data

(63) Continuation-in-part of application No. 12/256,453, filed on Oct. 22, 2008, now Pat. No. 8,135,640.

(51) Int. Cl.
*G06Q 40/00* (2012.01)
(52) U.S. Cl.
USPC .............................. 705/36 R; 705/35; 705/39
(58) Field of Classification Search
None
See application file for complete search history.

(56) References Cited

U.S. PATENT DOCUMENTS

| | | | | |
|---|---|---|---|---|
| 6,021,397 A * | 2/2000 | Jones et al. | ................. | 705/36 R |
| 2001/0042785 A1* | 11/2001 | Walker et al. | ................. | 235/379 |
| 2004/0117302 A1* | 6/2004 | Weichert et al. | ................. | 705/40 |
| 2005/0203824 A1* | 9/2005 | Freud et al. | ................. | 705/37 |
| 2008/0133351 A1* | 6/2008 | White et al. | ................. | 705/14 |
| 2009/0048973 A1* | 2/2009 | DeCristoforo | ................. | 705/44 |

* cited by examiner

*Primary Examiner* — Olabode Akintola

(57) ABSTRACT

System and method provide for making a synthetic cash advance to a credit cardholder via a purchase-payment exchange. A second person selects an item to be purchased by a cardholder for the second person, and in exchange for the cardholder's credit card purchase, the second person pays the cardholder an amount of money that is less than the amount charged to the cardholder's credit card. Using this invention, the second person receives the selected item (or has a payment made) at a discount, and the cardholder is able to transform a credit card purchase into a synthetic cash advance at the credit card's purchase interest rate. Two or more cardholders may bid in an online auction to complete the second person's financial transaction in exchange for the second person's money. A cardholder who submits a conforming bid, that is willing to accept the least amount of money, may be selected as the auction winner.

20 Claims, 2 Drawing Sheets

SYSTEM AND METHOD FOR MAKING A SYNTHETIC CASH ADVANCE USING A PURCHASE PAYMENT EXCHANGE

RELATED APPLICATIONS

This application is a continuation in part of co-pending U.S. patent application Ser. No. 12/256,453 filed Oct. 22, 2008 and claims priority thereto and incorporates it by reference in its entirety as if fully reinstated herein.

BACKGROUND OF THE INVENTION

Field of the Invention

The present invention generally relates to a value exchange system and method, and more particularly to facilitating a financial transaction in a purchase payment exchange system that transforms a credit card purchase into a synthetic cash advance.

A consumer has several payment methods to choose from (e.g. credit card, electronic fund transfer, etc.) when completing a financial transaction online. An online payment solution provider (e.g. PayPal®) may be used by the consumer to shield his financial information.

A credit card (not including so called "prepaid" and "secured" credit cards) having a cash advance feature will have two credit line limits, a greater "financial purchase credit limit" to complete financial transactions (e.g. an online purchase), and a lesser included "cash advance limit" to obtain cash. Such a credit card will also have different interest rates; a purchase interest rate cash and a cash advance interest rate. The cash advance interest rate is usually higher than the purchase interest rate. A credit cardholder (hereinafter "cardholder") using the credit card's cash advance feature will typically have to pay an additional "transaction fee" equal to 1-3% of the amount advanced, or a fixed minimum transaction fee amount (e.g. $50.00), whichever is greater.

A cardholder who wants a small amount of cash (e.g. $200.00), may not use the card's cash advance feature when the minimum transaction fee (e.g. $50.00) is perceived as being too large in relation to the desired amount of cash. Therefore, a need remains to enable a cardholder to use his/her credit card to acquire a small sum of cash with a proportionally smaller transaction cost.

Since a cardholder may obtain a cash loan from a "payday loan" provider, a need remains to provide credit card issuers greater flexibility in facilitating cash loans to cardholder clients, so that credit card issuers can compete more effectively against payday loan providers.

Summary of Certain Inventive Aspects

The present invention meets the above described needs by allowing a credit cardholder to use his credit card to pay a bill, or purchase an item (collectively "financial transaction") for a second person (hereinafter "second person") in exchange for the second person paying a sum of money (e.g. making an electronic funds transfer) to the cardholder that is less than the amount charged to the cardholder's credit card to complete the second person's financial transaction. As used herein, the phrase "paying a sum of money" includes making a sum of money available to the cardholder (e.g. available for pickup/withdrawal by the cardholder at a financial institution, depositing a sum to an account accessible by the cardholder, adding credit to a designated account, etc.), as well as authorizing a third party to act on behalf of the second party to pay the cardholder. This purchase-payment exchange effectively transforms a credit card purchase into a synthetic cash advance at the cardholder's credit card's lower purchase interest rate.

As used herein, the term "credit card" is to be interpreted broadly to include the cardholder's physical credit card, as well as the cardholder's personal information (e.g. last four numbers of the cardholder's social security/tax identification, date of birth, etc.) and associated credit card account information (e.g. account number, security code, expiration date, password, etc.) necessary to enable a third party (e.g. an online payment solution provider) to complete a financial transaction for a second person without requiring the cardholder's physical credit card to be present during the financial transaction.

Further, a cardholder using this invention may obtain cash for less than the credit card's minimum "transaction fee", by setting a "maximum cardholder discount" (i.e. the difference between what the cardholder is willing to pay to complete a second person's financial transaction using his credit card and the amount the cardholder is willing receive in exchange) in the cardholder's bid that is less than the credit card's minimum transaction fee. Additionally, since the cardholder receives the second person's money for completing the financial transaction (and not from the card issuer or payee), the cardholder may be able to obtain cash equal to the credit card's "credit purchase limit". The money made available to the credit cardholder is not a rebate, price reduction, merchant incentive, or credit card issuer incentive, but instead the source of the money is the second person. Additionally, the invention also allows a second person to have a financial transaction completed at a discount.

Payday loan providers usually require the borrower to repay a loan within one or two borrower pay periods (e.g. a month, if the borrower is paid bi-monthly). It is well known that costs and interest expressed as an annual percentage rate (APR) for payday loans are sometimes as high as 300%. Since credit card issuers typically provide a longer payback period and offer a lower APR than a pay day loan provider, the invention will enable credit card issuers to compete against payday loan providers by providing a new use of their respective credit cards that offers better repayment terms when a cardholder uses the purchase payment exchange system to obtain cash or its equivalent (e.g. a deposit to a cardholder's designated debit account, payment to a third part (e.g. alimony to an ex-spouse).

In a preferred embodiment, an online payment solution provider (hereinafter "OPS") using a Purchase-Payment Exchange System (hereinafter "PPES") as disclosed herein, acts as a facilitator to assist a second person, online merchant, financial institution, and a credit cardholder (collectively "participants") to complete a purchase-payment exchange. The OPS using the PPES authenticates participants' identities, establishes participant accounts, validates financial account ownership, issues PIN(s), authorizes transactions on behalf of participants, etc. The OPS may charge an account set-up fee, and a transaction fee (and/or commission) for facilitating a purchase-payment exchange.

A trusted OPS (e.g. a state-licensed money transmitter, escrow company, online/offline auction company, etc.) using the disclosed PPES will give confidence to participants, and increase the number of second person and cardholder bid requests submitted and fulfilled.

The system and method of the invention each have several aspects, no single one of which is solely responsible for its desirable attributes. Without limiting the scope of this invention as expressed by the claims which follow, it's more prominent features will now be discussed briefly. After considering this discussion, and particularly after reading the section entitled "Detailed Description of Certain Embodiments", one will understand how the features of this invention provide advantages that include a PPES that enables a cardholder to transform a credit purchase into a synthetic cash advance, a card issuer to obtain new business from an existing cardholder, a second person to have a financial transaction on his behalf completed at a discount, and an OPS to earn additional revenue for providing a new service.

One embodiment is a method to transform a credit card purchase into synthetic cash advance, comprising selecting a credit cardholder's bid by a purchase payment exchange system, using the cardholder's credit card by the purchase payment exchange system to complete a second person's financial transaction; and making an amount of money available to the cardholder in exchange for use of the cardholder's credit card to complete the second person's financial transaction, wherein the amount of money is a synthetic cash advance that is less than the amount charged to the cardholder's credit card.

Another embodiment is a system to have a financial transaction completed at a discount, comprising means to receive a second person's bid request to complete the second person's financial transaction, means to select a credit cardholder's conforming bid, means to use the credit cardholder's credit card to complete the second person's financial transaction; and means to pay the credit cardholder an amount of money in exchange for using the credit cardholder's credit card to complete the second person's financial transaction, wherein the amount of money is less than the cost to complete the second person's financial transaction.

Another embodiment is a system to facilitate a purchase-payment exchange, comprising means for making an amount of money available to a credit cardholder in exchange for using the cardholder's credit card to complete a second person's financial transaction, wherein the amount of money made available to the credit cardholder is less than the amount charged to the cardholder's credit card.

These and other features, aspects and embodiments of the invention will be described in more detail below.

DETAILED DESCRIPTION OF CERTAIN EMBODIMENTS

Figure 1:
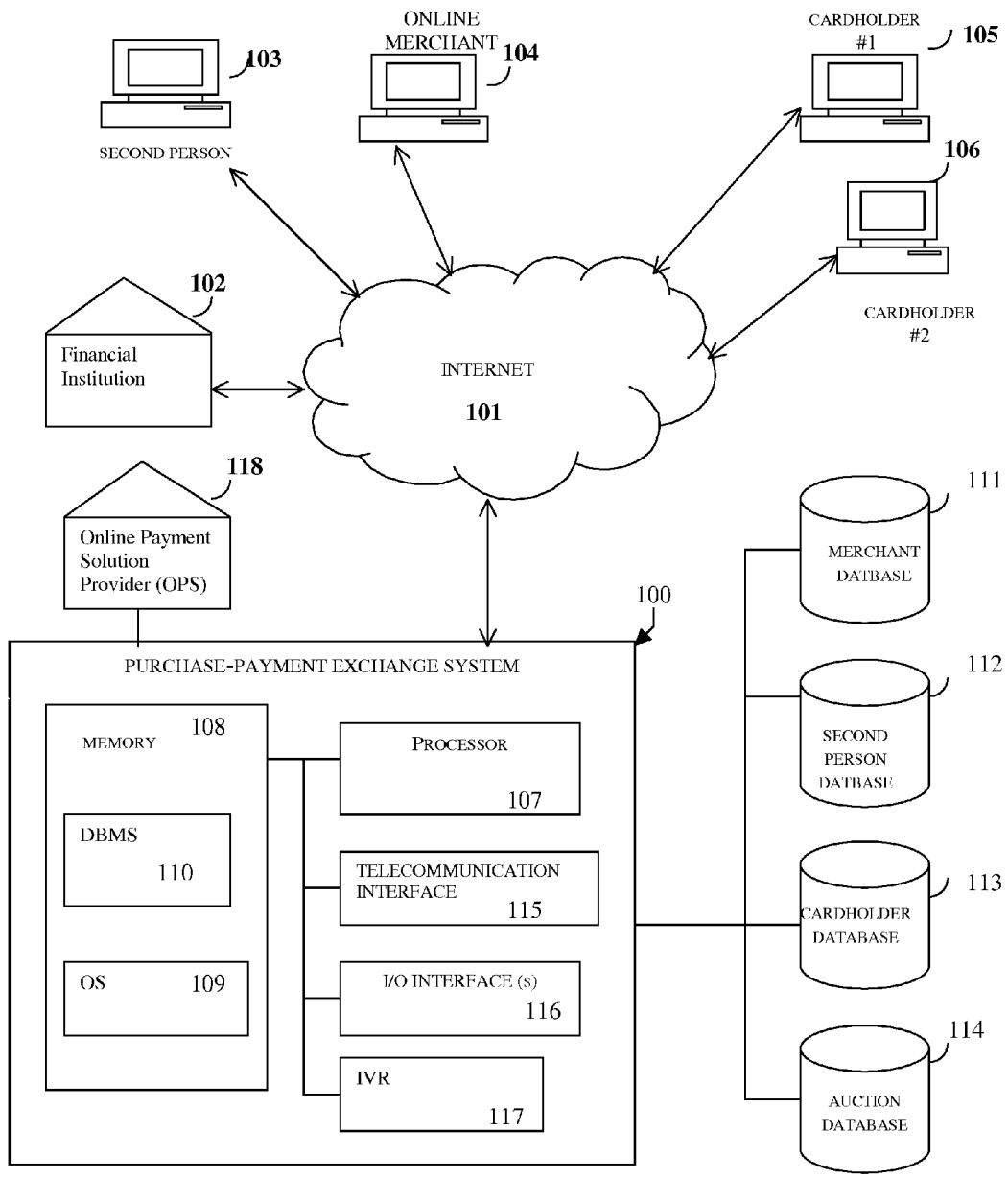
FIG. 1 is a block diagram illustrating an exemplary system in accordance with certain embodiments of the present invention.

Exemplary embodiments of the present invention will hereinafter be described with references to the figures, in which like numerals indicate elements throughout the several drawings. FIG. 1 is a block diagram illustrating an exemplary operating environment for implementation of certain embodiments of the present invention. The exemplary operating environment includes an OPS 118 using a purchase-payment exchange system (PPES) 100 of the present invention. The PPES 100 is preferably linked via an internet network 101 (which may be any public and/or private communication network and include wired and/or wireless segments) to at least one financial institution 102, a second person 103, an online merchant 104, and a credit cardholder 105. When a second credit cardholder 106 submits a cardholder bid, the second credit cardholder 106 is likewise linked to the PPES 100. The OPS 118 may house the PPES 100, or be connected to it via the internet network 101. As used herein, the term "financial institution" 102 should be interpreted broadly to include any State or Federal savings and loan association, a mutual savings bank, a State or Federal credit union, or any other person or entity who, directly or indirectly, holds a financial (e.g. demand deposit, brokerage, etc.) account belonging to a customer, or transmits money for others (e.g. Western Union).

The PPES 100 has a processor 107, and a memory 108 for storing data coupled to a processor 107. The processor 107 is configured to limit use of the PPES 100 to registered users (e.g. cardholders 105). For example, the processor 107 may be specially programmed so that a cardholder 105 attempting to access the PPES 100 via an OPS's 118 website (not shown), may be prompted to provide a user name and password (e.g. by typing on a keyboard, mobile phone keypad, touch screen, etc.) or providing an alternative suitable identifier (e.g. scanning a digit of the hand on a keyboard, etc.), or to register as a new user, before being allowed to see a bid, submit a bid request, etc.

The PPES 100 is contemplated as being a processor 107 driven device, or a collection of devices, that is configured for enrolling, verifying, and authenticating participants, and conducting auctions. The PPES 100 may further be configured for accessing and reading associated computer readable media having stored thereon data/and or computer executable instructions for implementing the various methods of the present invention. In particular, the processor 107 provides the business logic for the PPES 100 that supports and provides an environment for server side logic, expressed as objects, rules and computations, such as selecting a winning bid from a plurality of submitted cardholder 105 & 106 bids.

Additionally, the PPES 100 may have a telecommunication interface 115, and an interactive voice response unit (IVR) 117, so for example, a second person 103 and/or cardholder 105 may call in a bid to the PPES 100 and input menu options (e.g. submit a bid, add/update credit card information, check bid status, etc.) using voice, or touchtone commands.

The PPES 100 memory 108 may take the form of any computer readable medium. The memory 108 may be logically and/or physically divided into multiple units. The memory 108 stores data and program modules, for example, an operating system ("OS") 109, a database management system ("DBMS") 110. These and/or other programs may be executed by the PPES 100 to perform the various methods of the present invention.

The PPES 100 may include, or be in communication with, one or more searchable databases. By way of illustration only, the PPES 100 may be in communication with an online merchant database 111, a second person database 112, a credit cardholder database 113, and an auction database 114. These and/or other databases may also store any other data used or generated by the PPES 100. Those skilled in the art will appreciate that the illustrated database may be physically and/or logically separate from one another.

The PPES 100 may also include input/output ("I/O") interfaces 116 for providing logical connections to various I/O devices, such as a scanner, a mouse, etc. A system administrator may utilize these and other I/O devices to interact with the PPES 100. For example, a system administrator may interact with the PPES 100 to populate and edit the second person database 112, and other program modules. Those skilled in the art will appreciate that the PPES 100 may include alternate and/or additional components, hardware or software.

Thus configured or similarly configured, the PPES 100 may provide a means for a second person 103 to have a financial transaction completed for his/her benefit at a discount, in exchange for paying a cardholder 105 (e.g. by way of an electronic funds transfer) an amount that is less than the amount charged to the cardholder's 105 credit card to complete the financial transaction for the second person 103, when the PPES 100 is programmed to interact with a second person 103, an online merchant 104, a cardholder 105, and a financial institution 102, using the PPES 100 via an internet network 101. A credit card issuer (not shown) may obtain new business (i.e. credit card purchases for the benefit of a second person 103) from an existing cardholder 105, the cardholder 105 obtains cash at the credit card's purchase interest rate (i.e. transforms a credit card purchase into a synthetic cash advance), and the OPS 118 may earn a commission/fee for facilitating the completion of the financial transaction via the PPES 100.

Participants may access the PPES 100 to update information databases 111-114, submit bid requests, select a bid range, add a credit card, etc., via an OPS 118 website (not shown). Additionally, the PPES 100 may access the second person database 112 and cardholder database 113 to check for updated information.

A person (or entity) wishing to become a user of the PPES 100 may preferably become a registered user by accessing the OPS 118 website (not shown) via a computer (e.g. desktop or mobile) having internet 101 access. In an alternate embodiment, a person (or entity) may register as a user and access the PPES 100 using a phone to communicate over a wired or wireless network (not shown) with the telecommunication interface 115 and IVR 117 using voice or touchtone commands. In yet another alternate embodiment, a person may enroll in person at a financial institution 102 to become a user of the PPES 100.

The financial institution 102 may provide financial services, as well as provide (verify) information to the PPES 100 (e.g. second person 103 and cardholder 105 account information). In a preferred embodiment, the financial institution 102 will make second person 103 funds available to a cardholder 105 by allowing the cardholder 105 to withdraw cash from it (e.g. via the financial institution's 102 ATM network, a kiosk, over the counter, etc. (not shown)). Alternatively, the financial institution 102 may make an electronic funds transfer to an account designated by the cardholder 105, from which the cardholder 105 may withdraw cash, or draw against (e.g. a debit card issued by the OPS 118), or mailing a check/money order to the cardholder 105. The financial institution 102, by providing a physical location (e.g. ATM, cashier window) for a cardholder 105 to obtain the second person's 103 money (or its equivalent), may be able to acquire a new customer by offering other "off-line" services, such as a debt consolidation loan. Further, the financial institution 102 may make a payment to a cardholder's 105 payee whom the cardholder cannot pay using a credit card (e.g. alimony to an ex-spouse)

Figure 2:
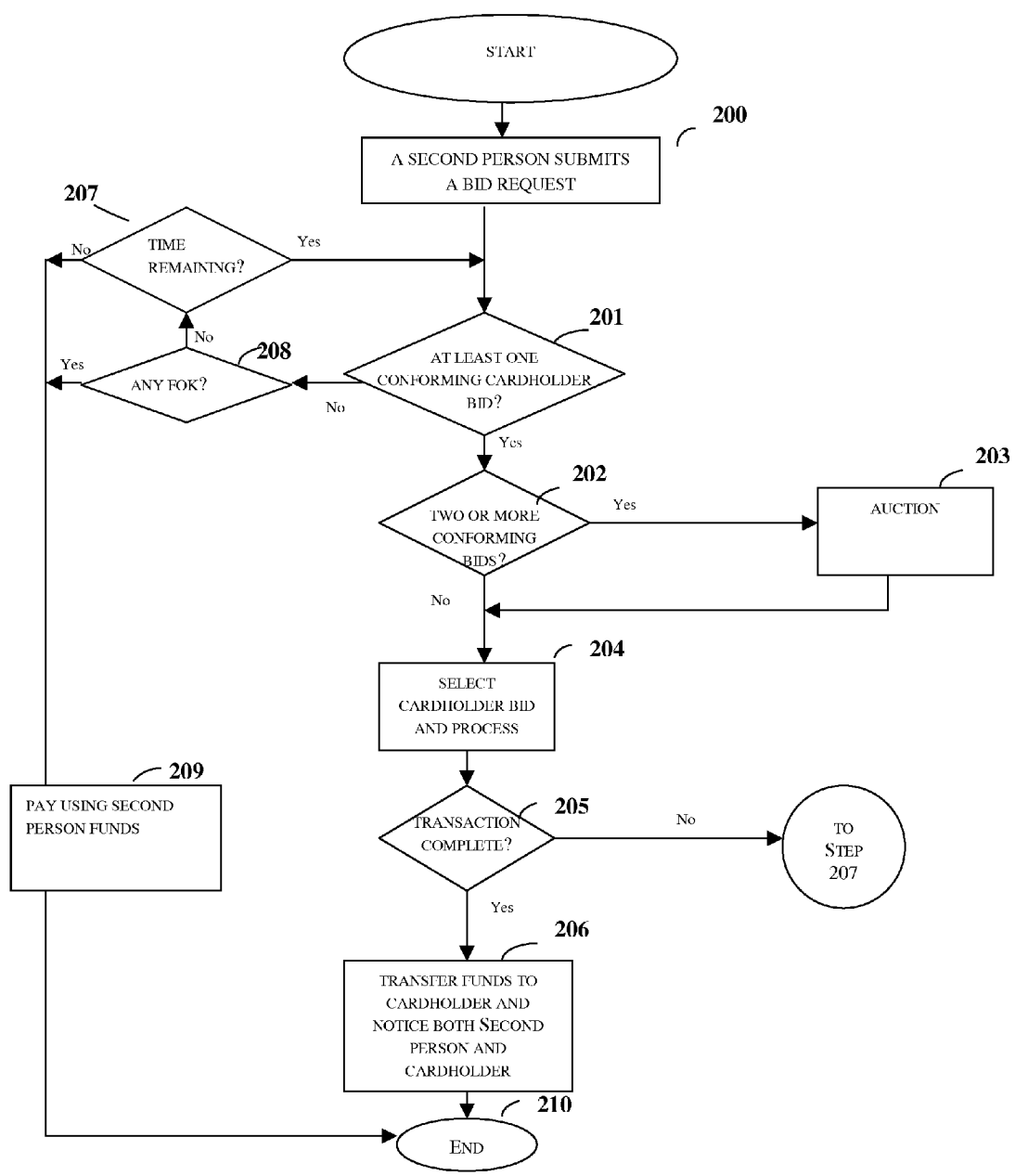
FIG. 2 is a flow diagram illustrating an exemplary method for making a purchase-payment exchange online in accordance with certain embodiments of the present invention.

FIG. 2 is a flowchart demonstrating, in further detail, one method of employing the PPES 100 such as that of FIG. 1, to make a synthetic cash advance using a purchase-payment exchange between a second person 103 and a cardholder 105, according to one embodiment of the invention.

In this embodiment, a second person 103 having a bank account (e.g. a demand deposit account, hereinafter "DDA") with a balance sufficient to make a purchase of an item in cash (e.g. via an "electronic check", debit, etc.), may obtain a selected item at a discount using this invention. The second person 103 selects a good or service (collectively "item") to be purchased/paid for by another from an online merchant 104.

While the example will discuss the transaction as a "purchase", it should be understood that the invention can also be used for the payment of a bill (e.g. mortgage payment) when the second person's 103 payee (e.g. mortgagor) accepts credit card payments. Therefore, the term "purchase" should be broadly construed to include the payment of any debt, as well as the purchase of an item or payment for a service. Further, while the example uses an "online merchant", the invention includes any payee (person or entity), online or offline, capable of being paid with a cardholder's 105 credit card (e.g. via phone, internet, fax transmittal, or cardholder 105 call-in/walk-in). In a preferred embodiment the PPES 100 will execute all purchase-payment transactions automatically online when the PPES 100 matches conforming bids between a second person 103 and a cardholder 105 (e.g. complete an online purchase, or transmit wire instructions); however, a party (e.g. cardholder 105, second person 103) may complete his/her respective performance offline (e.g. mail a check) if authorized by the counter-party, OPS 118, etc.

The second person 103 and cardholder 105 may have an account with the OPS 118, or may register and initiate the following procedure via the PPES 100 at the time of submitting their respective bid. In a preferred embodiment, the PPES 100 will be implemented by an OPS 118, and the identify of each participant will have been previously verified, the relevant financial information of each (e.g. account ownership, availability of funds/credit, transaction authorization via PIN, etc.) will likewise have been validated through a query to each participant's financial institution 102, credit service, or other external financial information source, and each will preferably have been issued one or more unique identifiers (e.g. username and password) for each second person 103 and cardholder 105 to complete a purchase-payment exchange.

The OPS 118, acting as a facilitator among the second person 103, financial institution 102, cardholder 105 and merchant 104, limits the disclosure of financial information and personal information of the participants, and provides reliability in completing a purchase-payment exchange.

In a preferred embodiment, the OPS 118 does not escrow the second person's 103 funds, but rather is pre-authorized and enabled to instruct the second person's 103 financial institution 102 to make funds available to the cardholder 105 (e.g. via an EFT after verifying that the cardholder 105 has completed the agreed upon financial transaction for the second person 103). In this way, the OPS's 118 PPES 100 provides a secure venue for participants to make a purchase-payment exchange, transforming the cardholder's 105 credit card purchase into a synthetic cash advance.

In an alternate embodiment, the OPS 118 may hold the second person's 103 funds in escrow (or use a third party escrow) and release the second person 103 funds to the cardholder 105 upon verifying that the cardholder 105 has completed the agreed upon financial transaction for the second person 103. Further, the OPS 118 may auction a second person's 103 bid request, when there is time to do so, and there are at least two potential cardholders (105 and 106) who may bid for the second person's 103 potential maximum cash amount (as detailed in the second person's 103 bid).

At step 200, a second person 103 submits a bid request to the OPS's 118 PPES 100. The second person's 103 bid request contains "bid conditions" and "financial transaction information". The second person's 103 bid conditions include the total price a cardholder 105 must pay (financial transaction price and any fee) to complete the proposed transaction, the minimum discount from the purchase price that the second person 103 will accept, and the credit card type(s) that are acceptable to a payee. In an alternate embodiment the purchase price bid condition may be replaced with a "maximum dollar amount", and the "minimum discount" may be replaced with a specified "maximum payout amount". Additionally, the second person's 103 bid conditions may include the time a bid will remain open. The OPS 118 may be allowed to round a financial transaction price and/or discount up to the nearest whole dollar.

In one embodiment, a second person 103 may post a bid request on the OPS's 118 website (not shown), for a cardholder 105 to view and submit a "conforming bid". A cardholder's 105 "conforming bid" is a cardholder's 105 bid that matches the second person's 103 credit card type, and meets or exceeds the second person's 103 minimum financial bid conditions (i.e. purchase price, minimum discount). A cardholder 105 may submit a bid having a maximum cardholder discount that exceeds the second person's 103 minimum discount amount (i.e. the cardholder 105 may accept less money than the difference between the purchase price and the second person's 103 minimum discount).

The PPES 100 may categorize second person 103 bid requests by a financial transaction price range (e.g. $40.00-$99.99, $100-$200, etc.), an acceptable credit card (e.g. Credit Card No. 1), a minimum discount (expressed as a dollar amount or percentage of the financial transaction price), or other suitable category.

For example, if the second person's 103 bid request is categorized by a purchase price range, and an item's purchase price is $200.00, a cardholder 105 who accesses the PPES 100 and selects a purchase price range of $100-$200, may see the following:

| Bid Conditions | |
|---|---|
| Financial transaction Price: | $200.00 |
| Minimum Discount: | $15.00 |
| Card Type(s): | Credit Card No. 1, Credit Card No. 2 |
| Time remaining: | 00 hours 15 minutes |

An interested cardholder 105 could then submit a cardholder 105 bid to make a $200.00 purchase with a Credit Card No. 1 credit card for the second person 103, and agree to accept $185.00 or less (since the second person's 103 minimum discount is $15.00).

In an auction to fulfill a second person's 103 bid request (to obtain a synthetic cash advance by a cardholder 105), a cardholder 105 whose conforming bid has the greatest discount at the end of an auction may be selected by the PPES 100 as the "winning bid". The cardholder 105 with the winning bid will receive the "purchase price", less (the greater of) the second person's 103 minimum discount or the cardholder's 105 maximum discount. In a preferred embodiment the second person 103 will pay any transaction fee or commission (collectively "fee") to the OPS 118. However the OPS 118 may charge (or waive) a fee in full (or in part) to each (or any) participant to encourage the use of the PPES 100 and promote good will among the participants and the OPS 118.

When two or more cardholder 105 & 106 bids tie, the PPES 100 may select the winning bid by choosing the conforming bid submitted first in time. Alternatively, tying cardholders 105 & 106 may be invited to submit revised bids (with the previous bid being a floor) for a second auction round, or employ other suitable tie breaking methods know by persons of ordinary skill in the art.

The second person's 103 bid request "purchase information" includes all other information necessary for the completion of a proposed transaction. For example, the purchase information may include the description of the item, merchant site, delivery method, destination, etc. In a preferred embodiment, the purchase information will be supplied to the online merchant 104 by the PPES 100 (having previously been supplied to the PPES 100 by the second person 103).

For example, the second person 103 may submit a bid request having bid conditions and financial transaction information to the PPES 100, such as:

| Bid conditions | |
|---|---|
| Financial transaction price | $1,000.00 |
| Minimum discount | $50.00 |
| Card(s) | Credit Card No. 1 |
| Purchase Information | |
| Product Description: | ABC Widget, model 12345 |
| Quantity: | 1 |
| Company: | AnyCo.com |
| | Destination: 789 Anywhere Street, Small Town, Ohio, U.S.A. 99999 |
| Delivery method: | US standard mail |
| Payee accepts: | Credit Card No. 1 |

In a preferred embodiment, the cardholder 105 will be able to see the second person's 103 "bid conditions" portion of a bid request to submit a conforming bid. In an alternate embodiment, the second person's 103 "Minimum discount" condition will not be viewable by the cardholder 105.

In a preferred embodiment, certain information may be withheld from the cardholder 105, such as the second person's 103 address or phone number, to shield the second person's 103 privacy and prevent the OPS 118 from being circumvented in the future. In an alternate embodiment, for an additional fee (or free for a second person 103 who is a high volume user of the PPES 100), all purchased items will be deliverable to the OPS 118, who will then reship the item(s) to the second person 103, to further shield the second person's 103 information.

In a preferred embodiment, a cardholder 105 may submit a subject matter or geographic use restriction to the PPES 100, so that the cardholder's 105 credit card will not be used to complete a financial transaction that the cardholder 105 would not complete for him/herself (e.g. not use the cardholder's 105 credit card to purchase items/pay for services that would violate Sharia law, buy from a payee outside of the cardholder's 105 country, etc.).

In a preferred embodiment, the second person 103 will have a verified payment source and will have preauthorized the OPS 118 to complete the second person's 103 financial transaction using that source if no conforming cardholder 105 bid is submitted (within the time limit set by the second person 103 or PPES 100) to select. For example, the OPS 118 may be pre-authorized to direct the second person's 103 financial institution 102 to pay for the second person's 103 financial transaction when no timely conforming cardholder 105 bid is submitted. In this way, the second person 103 will be able to complete the purchase, or timely make a payment, notwithstanding the lack of a conforming cardholder 105 bid. In cases such as these, the OPS 118 may provide a discount (or other monetary incentive) on a subsequent successful use of the PPES 100 by the second person 103.

In an alternate embodiment, the OPS 118 may require that the second person 103 transfer funds to the OPS 118 (or a third party escrow), sufficient to complete any financial transaction chosen by the second person 103, before allowing the second person 103 to submit a bid request. In this embodiment, the OPS 118 holds the second person's 103 funds in escrow pending the outcome of any submitted second person 103 bid request. If a second person's 103 bid request cannot be matched to a conforming cardholder 105 bid, or if the second person 103 cancels the financial transaction before a cardholder's 105 conforming bid is received and/or selected, the second person's 103 funds may be returned, or left with the OPS 118 for a later second person 103 financial transaction.

In another embodiment, a cardholder 105 who wants to transform a credit card purchase into a synthetic cash advance may submit a "cardholder 105 bid" to the PPES 100. In this embodiment the cardholder 105 offers his credit card(s) to be used to complete any financial transaction up to a specified dollar amount/price, or within a dollar amount/financial transaction price range, and a maximum discount, without seeing a second person's 103 bid request.

For example, a cardholder 105 who wants to obtain a synthetic cash advance, may submit a cardholder 105 bid to the PPES 100 such as:

| | |
|---|---|
| Financial transaction Price Range: | $300-$500.00 |
| Maximum Discount: | 10% |
| Card(s) on file: | Credit Card No. 1 |
| Time remaining: | 2 hours, 00 minutes |

Any second person 103 who submits a timely bid request to the PPES 100 with bid conditions that can be satisfied by the cardholder's 105 bid, could be matched and automatically processed by the PPES 100.

For example, if a second person 103 subsequently submits a bid request with a bid condition of "Fill or Kill" (FOK), financial transaction price $450.00, Credit Card No. 1, minimum discount $25.00", the cardholder's 105 bid could be selected, since $450.00 falls within the cardholder's 105 selected dollar range (i.e. $300-$500), the cardholder's 105 credit card is "Credit Card No. 1", and the cardholder's 105 maximum discount (i.e. $45.00, or 10% of $450.00) is greater than the second person's 103 minimum discount of $25.00. The participant's (cardholder 105 and second person 103) bids could be matched and processed.

In a preferred embodiment (continuing with the same example), when the cardholder's 105 maximum discount is greater than the second person's 103 minimum discount, the PPES 100 may transfer the purchase price to the cardholder 105, minus the cardholder's 105 maximum discount (i.e. a $405.00 net payout to the cardholder 105, $450.00-$45.00). In an alternate embodiment, the PPES 100 may increase the cardholder's 105 payout, when the cardholder's 105 maximum discount is greater than the second person's 103 minimum discount, by transferring an amount to the cardholder 105 equal to purchase price, minus the second person's 103 minimum discount of $25.00 (i.e. $425.00). In yet a further alternate embodiment, when the cardholder's 105 maximum discount is greater than the second person's 103 minimum discount, the participants may agree that the PPES 100 may select yet a different cardholder 105 payout (e.g. split the difference between the second person's 103 minimum discount and cardholder's 105 maximum discount), to encourage use of the PPES 100, and promote a sense of fair treatment among the participants and OPS 118.

In an alternate embodiment, two or more second person 103 bid requests (e.g. two different second person's 103, or one second person 103 with two bid requests) may be aggregated to fulfill a credit cardholder's 105 bid, when the second person's 103 relevant aggregate amounts (i.e. combined purchase prices and minimum discounts) do not exceed the cardholder's 105 price range and maximum discount.

In a preferred embodiment, the cardholder 105 will preauthorize the OPS's 118 PPES 100 to automatically complete any transaction(s) that meets the cardholder's 105 submitted bid criteria. In an alternate embodiment, the cardholder 105 may be notified of the match, and asked to confirm the proposed transaction before processing any credit card transaction.

In a preferred embodiment, the second person 103 (or PPES 100) may establish a time limit that a second person's 103 bid request may remain open for a cardholder's 105 conforming bid to be submitted to the PPES 100 and selected to fulfill the second person's 103 bid request.

A second person 103 may allow a bid request to remain open for a fixed period, or require that the second person's 103 bid request be matched immediately or cancelled (i.e. a "fill or kill" (FOK) bid condition). In an alternate embodiment, a time condition may allow a bid request to remain open until fulfilled with a "good until cancelled" (GTC) condition.

In an alternate embodiment, when an online merchant 104, or other payee, is able and willing to accept two or more credit cards to complete a single financial transaction, the PPES 100 may aggregate two or more cardholder 105 & 106 bids (or one cardholder 105 with two or more bids) to fulfill the second person's 103 bid request, as long as the combined cardholder 105 bids fulfill the respective second person's 103 bid conditions, and do not exceed any individual cardholder's 105 maximum financial transaction price range or maximum discount.

For example, two cardholders 105 & 106 may submit bids with a financial transaction price range that they hope will match the bid criteria of a second person's 103 bid request. Cardholder number one 105 submits a bid with a $400-$600 financial transaction price range, payment with Credit Card No. 1 credit card, and a maximum discount of $20.00. Cardholder number two 106 submits a bid with a $300-$400.00 financial transaction price range, payment with Credit Card No. 1 credit card, and a maximum discount of $40.00. Using the aforementioned $1,000.00 widget example, the PPES 100 may aggregate the two cardholder 105 & 106 bids, since the financial transaction price of $1,000.00 is equal to the combined maximum financial transaction price range of the cardholders' 105 & 106 bids (i.e. $600.00 and $400.00), the combined maximum discount ($60.00) acceptable to the cardholders 105 & 106 is greater than the second person's 103 minimum discount ($50.00), and each cardholder 105 and 106 offers use of a credit card (Credit Card Number One) acceptable by the second person's 103 payee. So when a payee will accept two credit cards to complete a financial transaction, the PPES 100 may select, aggregate, and complete the financial transaction using the two cardholder bids.

Once the second person 103 submits a bid request at step 200, the PPES 100 proceeds to step 201, where it is determined whether the PPES 100 has a conforming cardholder 105 bid by querying the cardholder database 113.

In a preferred embodiment, a cardholder 105 will also be able to submit a time limit condition on a bid. For example, a cardholder 105 may submit a bid that is good for the "Day" (e.g. the bid remains open until midnight or for 24 hours) and if not selected, is cancelled. Additionally, the cardholder 105 may agree that the PPES 100 is allowed to "reserve" an amount of credit on the cardholder's 105 card for a time (e.g. the duration that a cardholder's 105 bid remains open), to assure that sufficient credit is available to complete a financial transaction, if the cardholder's 105 bid is selected to complete a second person's 103 financial transaction.

In an alternate embodiment, a cardholder 105 may be requested to provide a second credit card, or other financial account (e.g. DDA) information to the PPES 100, and authorize the PPES 100 to use the second credit card/financial account as back up to complete a financial transaction, if the cardholder's 105 primary card fails to complete a financial transaction.

If it is determined that the cardholder database 113 has no conforming cardholder 105 bid to select, the PPES 100 proceeds to step 208, where it is determined if the second person's 103 bid request has a FOK condition by querying the second person database 112. If so, the PPES 100 continues to step 209, where the financial transaction is automatically completed using the second person's 103 funds. The PPES 100 may direct the second person's 103 financial institution 102 to complete the second person's 103 financial transaction. In an alternate embodiment, the PPES 100 may complete the financial transaction from funds held in escrow by the PPES 100. The PPES 100 then proceeds to step 210 and ends. In an alternate embodiment, when a FOK condition exists and there is no conforming cardholder 105 bid, the financial transaction is merely canceled.

If at step 208 it is determined that no FOK condition exists, the PPES 100 proceeds to step 207, where a query is made to the second person database 112 to determine whether there is any time remaining for a conforming cardholder 105 bid to be submitted to complete the second person's 103 financial transaction. If no time remains for a cardholder 105 to submit a conforming bid, the PPES 100 proceeds to step 209 where the financial transaction is completed using the second person's 103 funds (or alternatively the second person's 103 bid request is canceled). The PPES 100 then proceeds to step 210 and ends.

In an alternate embodiment, the PPES 100 may notify the second person 103 of his bid request status (e.g. no conforming cardholder 105 bid), and give the second person 103 an opportunity to extend the time the bid request remains open, cancel the financial transaction, or complete the financial transaction using the second person's 103 funds/credit card.

If at step 207, it is determined that time remains for a cardholder's 105 conforming bid to be submitted, the PPES 100 cycles back to step 201 to determine if a conforming cardholder 105 bid exists, by querying the cardholder database 113. The PPES 100 will automatically continue to cycle thru the aforementioned steps (e.g. in regular, repeating intervals) until time runs out (e.g. as set by the second person 103), or until at least one conforming cardholder 105 bid is received.

If at step 201, it is determined that a conforming cardholder 105 bid has been submitted to the PPES 100, the PPES 100 proceeds to step 202 where it is determined if the PPES 100 has received two or more conforming bids by querying the cardholder database 113. At step 202, if there are not two or more conforming bids, the PPES 100 proceeds to step 204.

In a preferred embodiment, when two or more conforming cardholder bids 105 & 106 have been submitted to the PPES 100, the PPES 100 proceeds to step 203 to auction the second person's 103 bid request. Cardholders 105 & 106 with conforming bids may be notified (e.g. by email, text message) that the second person's 103 bid will be filled by auction.

A link and an auction identification number may be communicated (e.g. via email, SMS, etc.) to the cardholders 105 & 106 to participate in the auction. Cardholders 105 & 106 who follow the link, log-in, and enter the auction identification number may participate in the auction. The PPES 100 or second person 103 may set a time limit on the auction.

In a preferred embodiment, cardholders may be allowed to see other cardholder bids and revise their respective maximum discounts, to compete for the second person's 103 money indicated in the bid request until the auction ends. Further, the PPES 100 may display (e.g. via a computer screen, or mobile phone's LCD (not shown)) how much cash the cardholder 105 will net out (receive) if the cardholder's 105 bid is accepted, to prevent a cardholder 105 from making a choice that would be less advantageous than simply using the credit card's cash advance feature. In an alternate embodiment, the cardholder 105 will not know how many cardholders are participating in an auction, or what their respective bids are.

In an alternate embodiment, the PPES 100 at step 201 may select the first conforming cardholder 105 bid submitted, notwithstanding that more than one conforming cardholder 106 bid exists.

At step 203, the conforming cardholder 105 bid with the greatest cardholder discount from purchase price (i.e. the cardholder willing to accept the least amount of cash) will be selected as the winning bid. Once a winning bid is selected, the PPES 100 proceeds to step 204. Conducting an auction, breaking ties, etc. are well known by those skilled in the art, and so are not detailed further herein.

At step 204, the PPES 100 processes the winning cardholder 105 bid, using the selected cardholder's 105 credit card to complete the second person's 103.

The PPES 100 then proceeds to step 205 where it is determined if the financial transaction was successfully completed (e.g. credit card charge was approved, item shipped). Upon verification of transaction completion, the PPES 100 proceeds to step 206. In a preferred embodiment, the OPS 118 is pre-authorized to instruct the second person's 103 financial institution 102 to make funds available to the cardholder 105 (e.g. a designated account via an EFT). The OPS 118 may collect a service fee from the second person 103, the cardholder 105, or both.

In an alternate embodiment, when the OPS 118 escrows the second person's 103 funds, the PPES 100 will transfer, or otherwise make available (e.g. cash via a kiosk, cash over the counter of a financial institution 102, money transmitter, etc.) the second person 103 funds to the cardholder 105, when verification is made that the second person's 103 financial transaction has been completed.

The PPES 100 notifies (e.g. via email, text message, etc.) both the second person 103 and cardholder 105 that the financial transaction(s) was completed. The PPES 100 proceeds to step 210 and ends.

At step 205, when a transaction was not successfully completed, the PPES 100 proceeds to step 207 and queries the second person database 112 to determine if there is any time remaining to fulfill the second person's 103 bid request. If time remains, the PPES 100 automatically cycles back to step 201. If no time remains for a cardholder 105 to submit a conforming bid, the PPES 100 proceeds to step 209, where the financial transaction is completed using the second person's 103 funds (or is cancelled). The PPES 100 then proceeds to step 210 and ends.

In an alternate embodiment, the PPES 100 may notify the second person 103 that the second person's 103 bid request could not be fulfilled, or that the cardholder's 105 financial transaction failed, and give the second person 103 an opportunity to extend the time the second person's 103 bid request remains open, cancel the second person's 103 bid request, or complete the financial transaction using the second person's 103 funds or credit card.

In yet another alternate embodiment, when a cardholder 105 transaction fails, before proceeding to step 207, the cardholder 105 whose financial transaction failed (e.g. the attempted financial transaction exceeds the card's credit limit) may be allowed an opportunity to perform the terms of the winning bid using a second (back-up) credit card (or other cardholder 105 account), preferably already registered with the PPES 100 and that the OPS 118 has been preauthorized to use for such an occurrence. In yet another alternate embodiment, when a cardholder's 105 bid was selected by way of an auction and fails, the PPES 100 may attempt to process the second (greatest discount) conforming cardholder 106 bid before proceeding to step 207, after obtaining permission from the second place cardholder 106 and/or second person 103.

As may be seen from the foregoing, the present invention provides a system and method for a credit cardholder to transform a credit card purchase into a synthetic cash advance via a purchase-payment exchange system, at the card's purchase interest rate, as well as enabling the card holder to obtain a synthetic cash advance with a smaller transaction cost (by setting a cardholder's maximum discount that is less than the credit card's minimum cash advance transaction fee). Further, since the cardholder is making a "purchase", he/she may be able to obtain more cash than the card's lower "cash advance" limit. Additionally, the invention provides a second person a means to obtain an item, or have a payment made on his behalf, at a discount.

The disclosed invention creates a new source of revenue for online payment solution providers and online auction providers. Finally, the invention creates a competitive advantage for card issuers in competing for small loans normally serviced by "payday loan" providers, by making funds available to existing cardholder clients at a lower interest rate and longer payback period than payday loan providers, without any additional cost.

It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

What is claimed is:

1. A method to transform a credit card purchase into synthetic cash advance, comprising:
   selecting a credit cardholder's bid by a purchase payment exchange system,
   using the cardholder's credit card by the purchase payment exchange system to complete a second person's financial transaction; and
   making an amount of money available to the cardholder in exchange for use of the cardholder's credit card to complete the second person's financial transaction, wherein the amount of money is a synthetic cash advance that is less than the amount charged to the cardholder's credit card.

2. The method of claim 1, wherein the money is made available to the cardholder via one of a group, the group comprising an electronic funds transfer, a credit to a designated account, a check, a money order, cash via an ATM, cash via a kiosk, and cash over the counter of a financial transaction.

3. The method of claim 1, wherein the cardholder's bid includes one of a group, the group comprising a purchase price, a discount from the purchase price, and a credit card to be used to complete the second person's financial transaction.

4. The method of claim 3, wherein the purchase price comprises one of a group, the group comprising a maximum dollar amount and a dollar amount range.

5. The method of claim 3, wherein the discount from the purchase price is the difference between the purchase price and the amount the cardholder is willing to be paid in exchange for completing the second person's financial transaction.

6. The method of claim 1, further comprising means to select the cardholder bid from a plurality of cardholder bids.

7. The method of claim 6, further comprising means to select the cardholder bid having the greatest cardholder discount.

8. The method of claim 1, further comprising means to direct the second person's financial institution to make the amount of money available to the credit cardholder.

9. The method of claim 1, further comprising means for an online payment solution provider to pay the cardholder with funds held in escrow.

10. The method of claim 1, further comprising a means for aggregating two or more credit cardholder bids to complete a second person's financial transaction when an individual credit cardholder's bid financial transaction price range is insufficient to complete a financial transaction for the second person.

11. The method of claim 1, wherein the money obtained by the credit cardholder is obtained at the credit cardholder's credit card purchase interest rate.

12. The method of claim 1, wherein the amount of money made available to the credit cardholder is not a rebate, price reduction, merchant incentive, or credit card issuer incentive.

13. A system to have a financial transaction completed at a discount, comprising:
   means to receive a second person's bid request to complete the second person's financial transaction;
   means to select a credit cardholder's conforming bid;
   means to use the credit cardholder's credit card to complete the second person's financial transaction; and
   means to pay the credit cardholder an amount of money in exchange for using the credit cardholder's credit card to complete the second person's financial transaction, wherein the amount of money is less than the cost to complete the second person's financial transaction.

14. The system of claim 13, wherein the credit cardholder's conforming bid comprises an offer by the credit cardholder to complete a second person's financial transaction using the credit cardholder's credit card, and a discount from the cost to complete the financial transaction, wherein the discount is equal to or greater than the second person's minimum discount.

15. The system of claim 13, further comprising the step of selecting the conforming credit cardholder's bid via an auction, when there are two or more conforming cardholder bids.

16. A system to facilitate a purchase-payment exchange, comprising:
   means for making an amount of money available to a credit cardholder in exchange for using the cardholder's credit card to complete a second person's financial transaction, wherein the amount of money made available to the credit cardholder is less than the amount charged to the cardholder's credit card.

17. The system of claim 16, further comprising means for the second person to pre-approve the second person's financial institution to make a payment to the credit cardholder.

18. The system of claim 16, wherein a winning credit cardholder is chosen via an auction, wherein the auction criteria for the winner includes the credit cardholder bid having the greatest cardholder discount.

19. The system of claim 16, wherein the money obtained is obtained at the credit cardholder's credit card purchase interest rate.

20. The system of claim 16, wherein the amount of money made available to the credit cardholder is not a rebate, merchant incentive, or a price reduction.

* * * * *